United States Patent [19]
Casanueva et al.

[11] Patent Number: 5,860,663
[45] Date of Patent: Jan. 19, 1999

[54] LAND TRANSPORTATION DEVICE

[75] Inventors: Manual Casanueva, Viña del mar; Elias Cancino, Valparaiso; Ariel Nuñez, Raneagua, all of Chile

[73] Assignee: Universidad Catolica De Valparaiso Av. Brasil, Valparaiso, Chile

[21] Appl. No.: 867,238

[22] Filed: Jun. 2, 1997

Related U.S. Application Data

[63] Continuation of Ser. No. 569,783, Dec. 8, 1995, Pat. No. 5,634,651.

[30] Foreign Application Priority Data

Dec. 9, 1994 [CL] Chile ......................................... 1845-94

[51] Int. Cl.$^6$ .................................................... A63G 25/00
[52] U.S. Cl. ............................. 280/208; 114/270; 472/20
[58] Field of Search ................................ 280/1.181, 208; 114/270; 441/78; 472/20, 32, 34

[56] References Cited

U.S. PATENT DOCUMENTS

| | | | |
|---|---|---|---|
| 520,899 | 6/1894 | Ronk | 441/78 |
| 2,909,145 | 10/1959 | De Hertelendy | 280/208 |
| 3,718,342 | 2/1973 | Freed | 280/208 |
| 4,579,336 | 4/1986 | Morin | 441/78 |
| 5,183,386 | 2/1993 | Feldman | 416/119 |

FOREIGN PATENT DOCUMENTS

| | | |
|---|---|---|
| 1293749 | 12/1991 | Canada . |
| 2428447 | 1/1980 | France . |
| 237298C | 5/1910 | Germany . |
| 2300403 | 7/1974 | Germany . |
| 2604132 | 8/1977 | Germany . |
| 2619951 | 11/1977 | Germany . |
| 2244009 | 11/1991 | United Kingdom . |
| WO87/02099 | 4/1987 | WIPO . |

*Primary Examiner*—Jesus D. Sotelo
*Attorney, Agent, or Firm*—Knobbe, Martens, Olson & Bear, LLP

[57] ABSTRACT

A land transportation device for compact, sandy and open land, with or without a slope, based on the intersection of two reinforced and identical truncated rings in orthogonal planes with respect to each other. The geometric centers shifted of the rings are shifted over the line of intersection of these planes. The weight of the device is reduced since it is made up of two light truncated rings, while at the same time, the cabin space is increased. The rings present a soft friction surface which gives the device better adherence to the ground, reducing the vibrations and facilitating the movement of the device. The device also possesses a hinge system which makes it possible to fold the ring on two axes, parallel to each other, thereby reducing its size. The disassembled device can be placed in a rectangular box for transportation and storage.

62 Claims, 11 Drawing Sheets

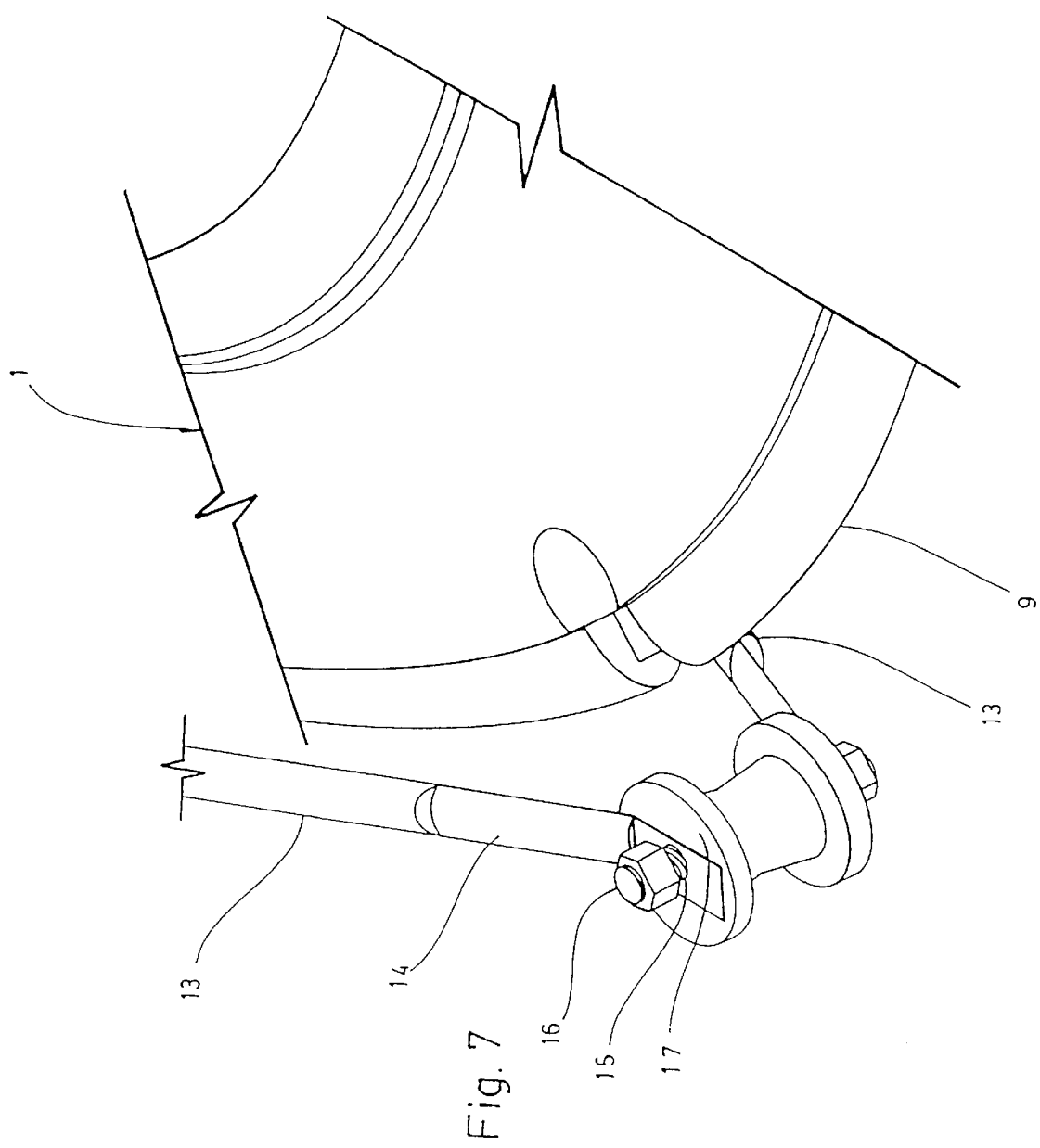
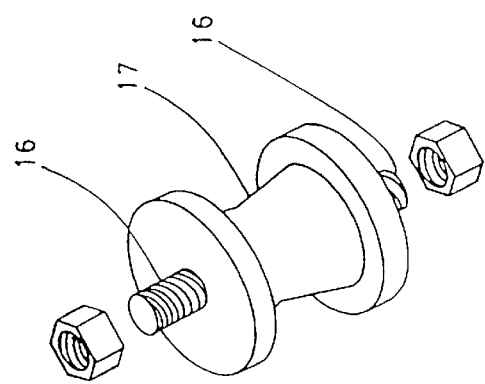

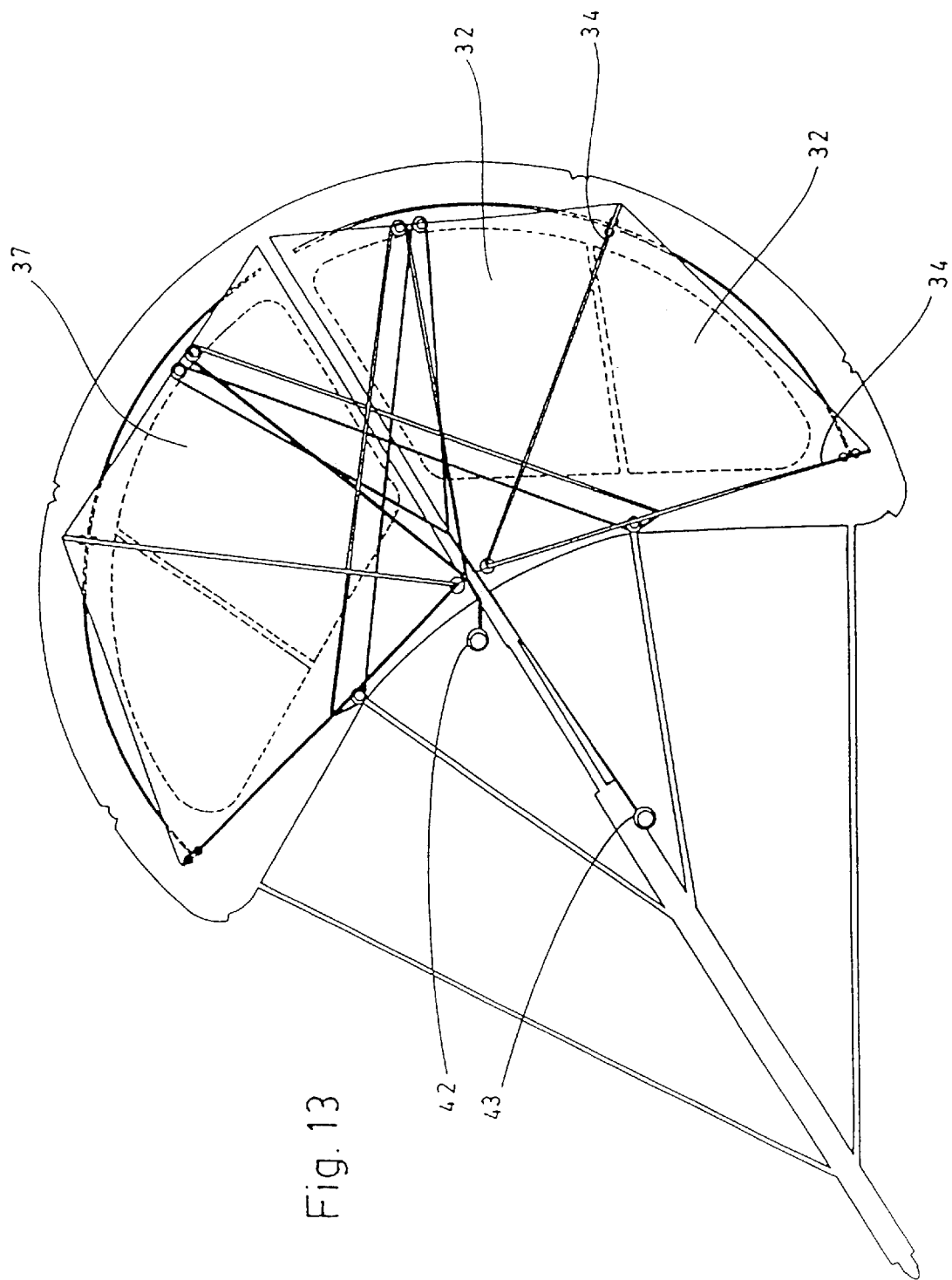

LAND TRANSPORTATION DEVICE

This application is a continuation of U.S. patent application Ser. No. 08/569,783, filed Dec. 8, 1995, now U.S. Pat. No. 5,634,651.

BACKGROUND OF THE INVENTION

1. Field of the Invention

The invention relates to an improved version of a land transportation device for compact, sandy and open land, with or without a slope.

2. Description of the Prior Art

Spherical land transportation devices for open compact sandy soils with or without a slope, where there are winds and slopes, in the field of adventure and recreational sport, present certain usage and transportation disadvantages.

One of the most frequently used land transportation shapes for adventure and recreational sport, among spherical devices, consists of the Olympic wheel, made up of a conventional cylindrical wheel, which requires great effort for use, inasmuch as it is a gymnastic device.

On the other hand, Salvador Dali's pedal sphere has the disadvantage of not being steerable or capable of being disassembled and presents difficulties in horizontal instability.

The invention of the land transportation device according to Chilean Patent Application No. 421-93, based on the merger of a wheel and propeller, presents the disadvantage that its rigid friction surface can produce vibrations, it has a compact cabin and, because of the weight of its structure, in addition to being partially capable of being disassembled, it is difficult to ship.

SUMMARY OF THE INVENTION

The present invention offers an improved version of a land transportation device for sandy and open lands with or without a slope, based on the intersection of two identical and reinforced truncated rings. The rings make up orthogonal planes with each other with their geometric centers shifted over the line of intersection of these planes. The improvement in the structure makes it possible to resolve the disadvantages of the previous invention in several ways: the weight of the device is reduced because it is made up of two light truncated rings, while at the same time the cabin space is increased, the rings present a soft friction surface which gives the device better adherence to the ground, reducing the vibrations and facilitating the movement of the device; the device also possesses a hinge system which makes it possible to bend the rings on two axes parallel to each other, thereby reducing the size and enabling storing of the disassembled device in a rectangular box for its transportation.

For a better explanation of the invention, a preferred embodiment is described below in relation to the accompanying figures.

BRIEF DESCRIPTION OF THE DRAWINGS

FIG. 6 is a perspective view of the connection part of the tension rods with the two separate nuts of the rebushed bolts;

FIG. 7 is a perspective view of the tension rods joined to the rebushed bolts very close to the fastening hole in the ring;

FIG. 13 is a rear elevated view of the device considering an alternative of the sail mechanism, according to FIG. 12, in a completely unfurled position.

DESCRIPTION OF THE PREFERRED EMBODIMENTS

With reference to the attached figures, the invention consists of an improved version of a land transportation device consisting of two identical and reinforced truncated rings 1, which make up orthogonal planes with each other, with their geometrical centers shifted over the intersection line 2 of these planes.

Figure 1:
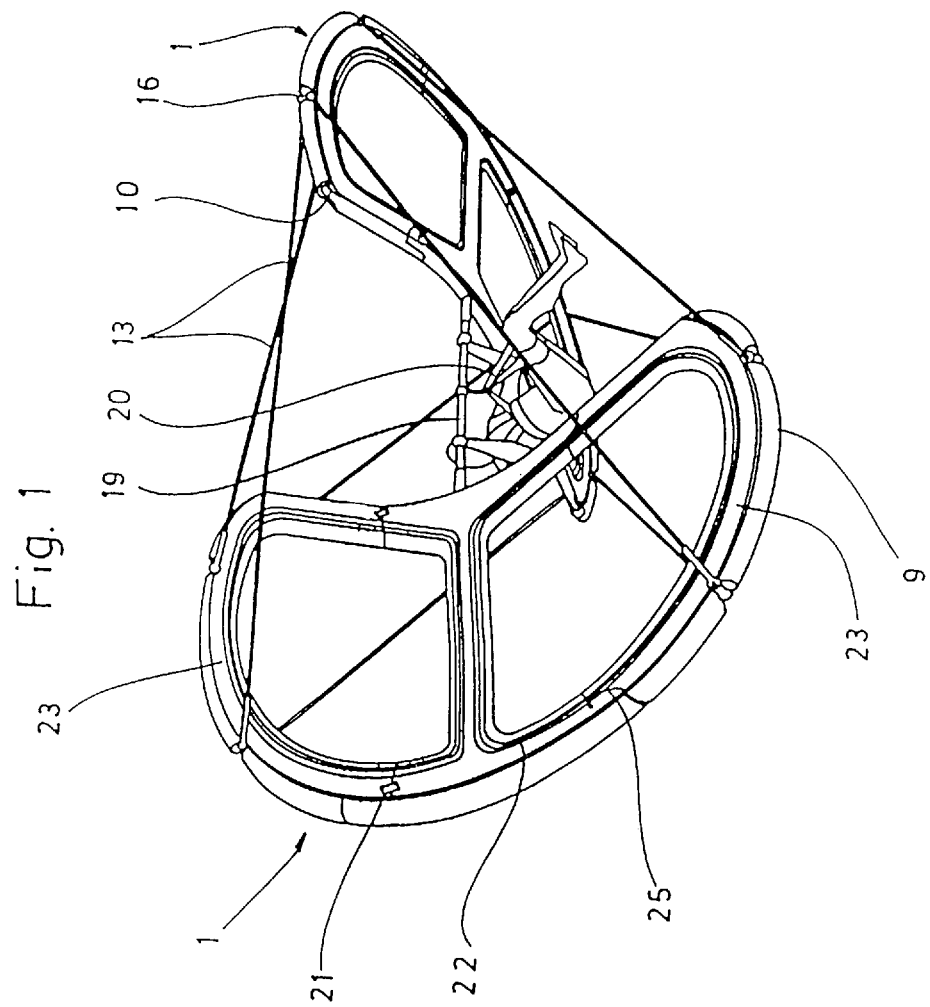
FIG. 1 is a perspective view of the device in use.
Figure 2:
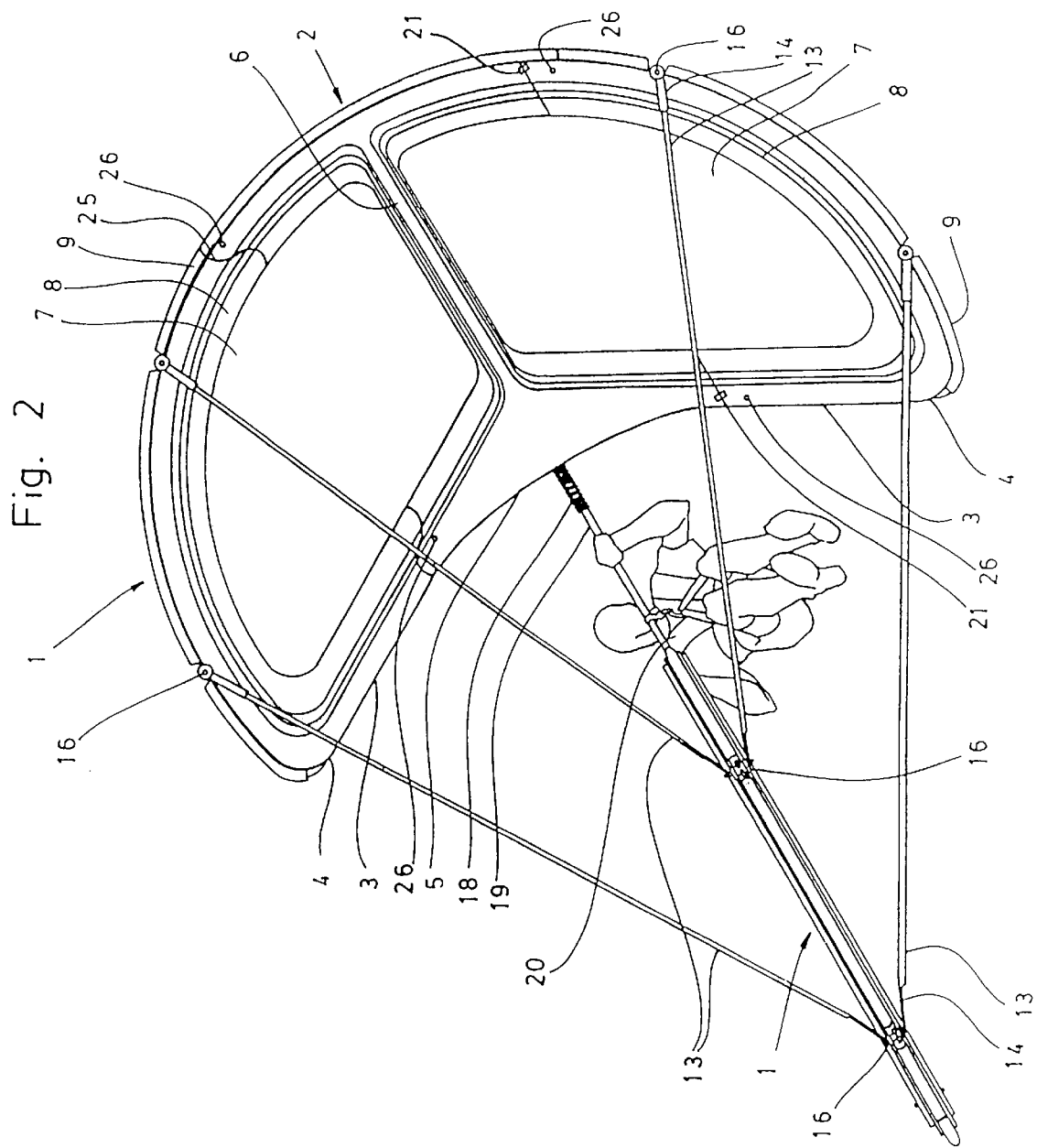
FIG. 2 is a front elevated view of the device in use.

As seen in FIGS. 1 and 2, each ring 1 possesses a circular sector which disappears over one-third of its circumference, with the two remaining thirds of the arc being connected through two radial bars 3. The bars 3 clamp to the curvature of the ring 1 by means of their rounded ends 4 and are joined together on the intersection line 2, at a slightly curved central vertex 5, slightly shifted from the geometric center of the ring 1 toward its curvature. A central linear reinforcement 6 extends from the vertex 5. The reinforcement 6 has rounded ends that clamp to the curvature of the ring 1 and to the radial bars 3, dividing the truncated ring 1 into two open sections 7, symmetric with respect to the axis that runs along the intersection line 2.

Figure 4:
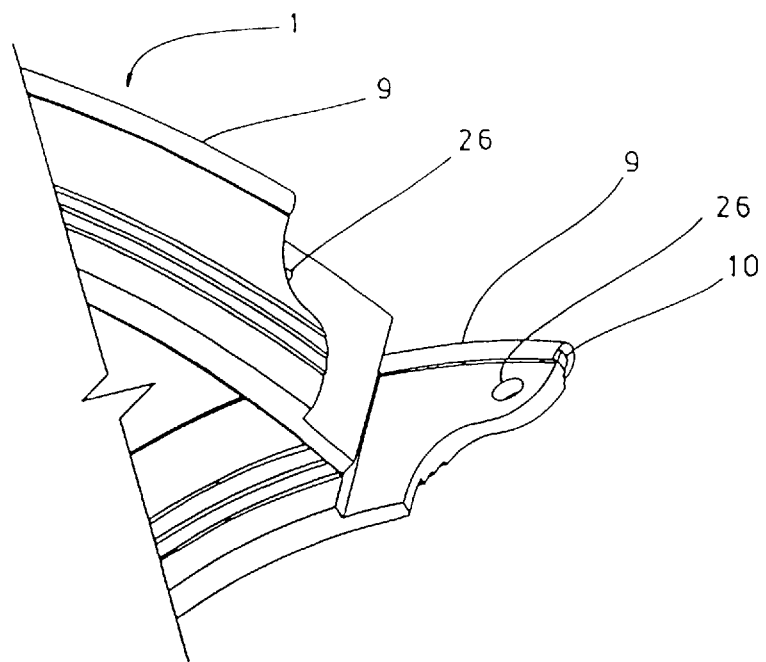
FIG. 4 is a perspective view of the hinge mechanism with the ring partially folded.
Figure 5:
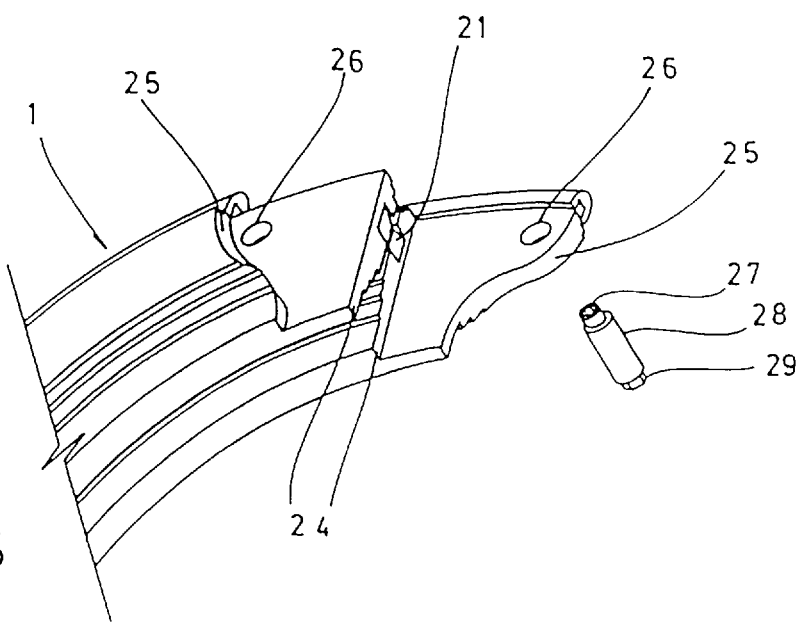
FIG. 5 is a perspective view of the hinge mechanism with the ring entirely folded, showing also the Allen bolt for fastening both sections of the ring to ensure the assembly of the device.

Both openings 7 are reinforced around the perimeter, both on the front and rear face, by an edge 8 of expanded polyurethane comprising three successive levels decreasing toward each opening 7. With reference to FIGS. 4 and 5, the external profile of the curvature of. The ring 1 has a slightly projecting convex rubber protection 9 adhered to a central projection 10 over the thickness of the curve. The central projection 10 barely projects outward at the ends of the rubber 9 over the rounded ends 4 of the radial bars 3.

Figure 8:
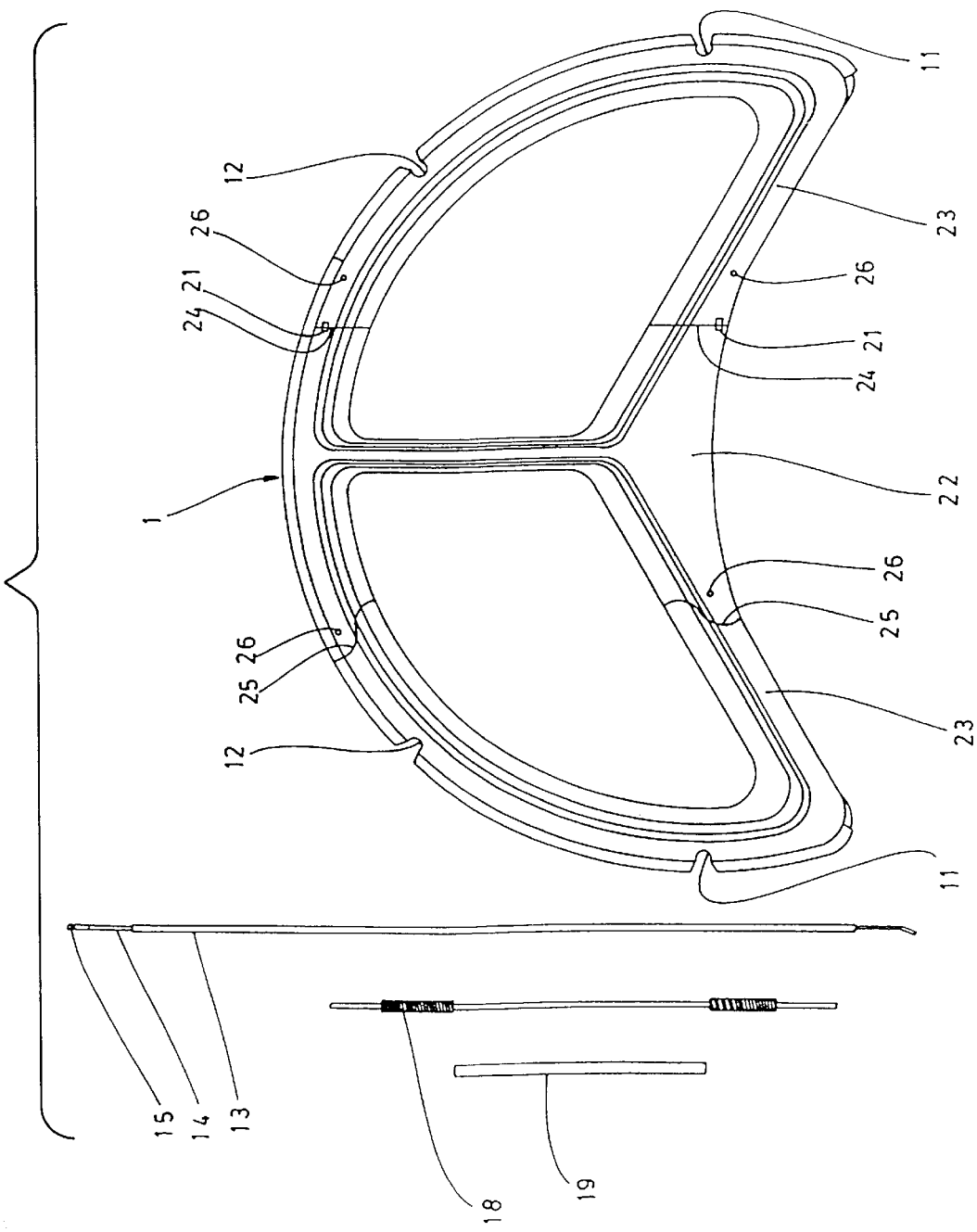
FIG. 8 is an upper plan view of the disassembled device.

As best seen in FIG. 8, proximate the rounded ends 4 and toward the curvature of the ring 1 on the axis of its diameter perpendicular to the central reinforcement 6, there are located two small holes 11 that pierce the front and rear walls reducing the central projection 10 and the rubber 9. Two other small holes 12 likewise pierce the walls of the ring 1 on the virtual prolongation of the radial bars 3 in the curvature of the ring 1, reducing the central projection 10 and the rubber 9. The two small holes 12 are spaced the same distance between the central reinforcement 6 and the other two small holes 11. To these four small holes are connected the tension tubes 13 that give the device its structure.

The eight tension tubes 13 consist each of a filled or hollow elongated tube filled with expanded polyurethane. As shown in FIG. 7, the ends of the tubes 13 are flattened, as at 14, perpendicular to one another. The flattened ends connect to a small inclined terminal portion which has a central perforation 15. The four tension tubes 13 have their inclined terminal portions oriented toward one side, symmetrically opposed to one of the inclined terminal portions of the other four tension tubes 13. Each pair of tension tubes 13 with opposite symmetrically inclined terminal portions are joined to a connector made up of two rebushed bolts 16 and a rubber support 17 of two truncated conical sections joined at their smaller bases, as seen in FIGS. 6 and 7. The larger bases of the rubber supports 17 are joined each to an annular projection from the center of which the two opposed bolts 16 project. The bolts 16 extend through the central perforation 15 of the tension tubes 13 and are secured with nuts.

Figure 3:
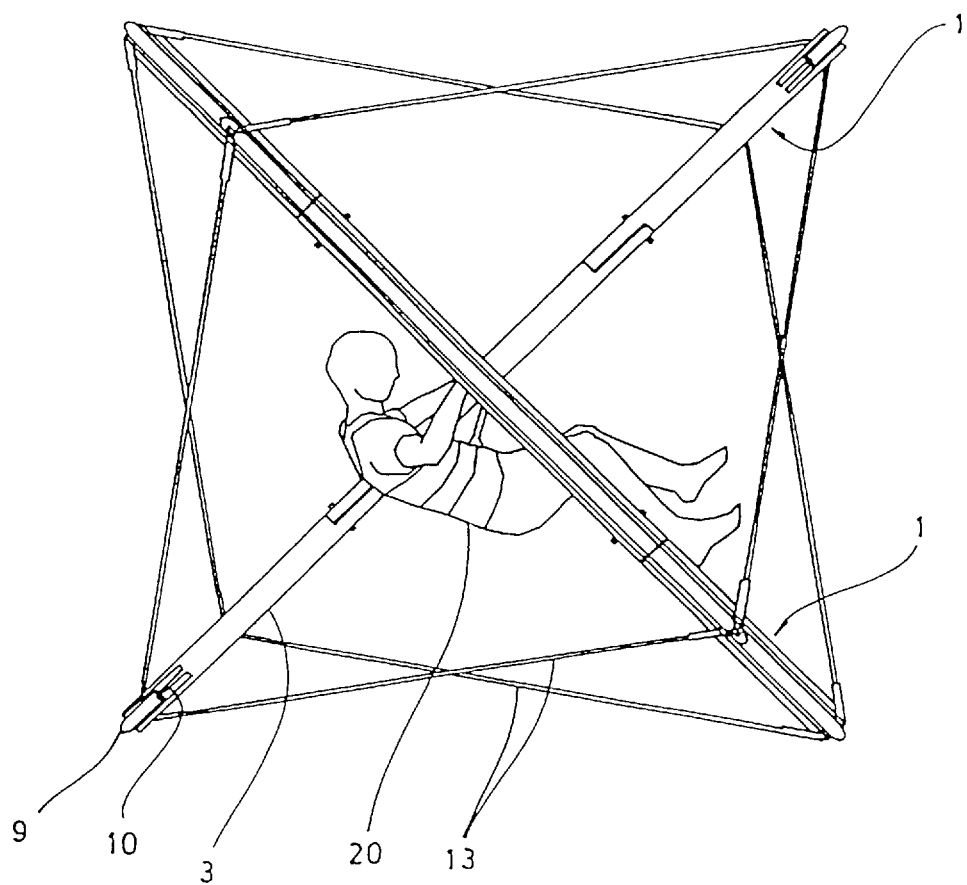
FIG. 3 is a side elevated view of the device in use.

As seen in FIGS. 1–3, the connectors are positioned in the small holes 11 and 12 in such a way that all the pairs of tubes 13 are directed from one hole 12 over the virtual projection of the radial bars 3 toward a hole 11 on the axis of the diameter perpendicular to the central reinforcement 6 of the opposite ring 1. The device is assembled so that the tension tubes 13 are joined together, forming vertices that comprise a sharp angle and keep the rings 1 rigid, thereby structurally closing the device. When the device is assembled, both rings 1 oriented orthogonally present radial bars 3 near the center of the opposite ring 1. Both central vertices 5 are separated approximately by the radius of the ring 1, generating a central space or driver's cabin. In the central space, both rings 1 are connected with a fastening bar with two springs 18 at its ends located on the intersection line 2. The ends of the fastening bar are fastened to the central vertex 5 of each ring 1. The central area of the vertex 5 coincides with the geometric axis of intersection of both rings 1. A tube 19 of a shorter length and larger diameter than the fastening bar is joined together with the fastening bar by bearings, making it possible for one bar to spin freely over another. A harness 20 for holding the driver is fastened to the tube 19. The harness 20 is made up of one support for the torso and another for the pelvis, independent of each another, but joinable by means of chest and waist clips. The harness 20 also has an independent support for the knees which can be detached at the driver's discretion.

Parallel to the central reinforcement 6, four hinges 21 are located, distributed in pairs on opposite sides of the reinforcement 6. Each pair of hinges 21 consists of one on the curvature of the ring 1 and the other over the radial bar 3. One pair of hinges 21 is placed toward the front face of the ring 1 and the other toward the rear face. As seen in FIG. 1, the hinges 21 divide the ring 1 into one central section 22 and two end sections 23.

Figure 9:
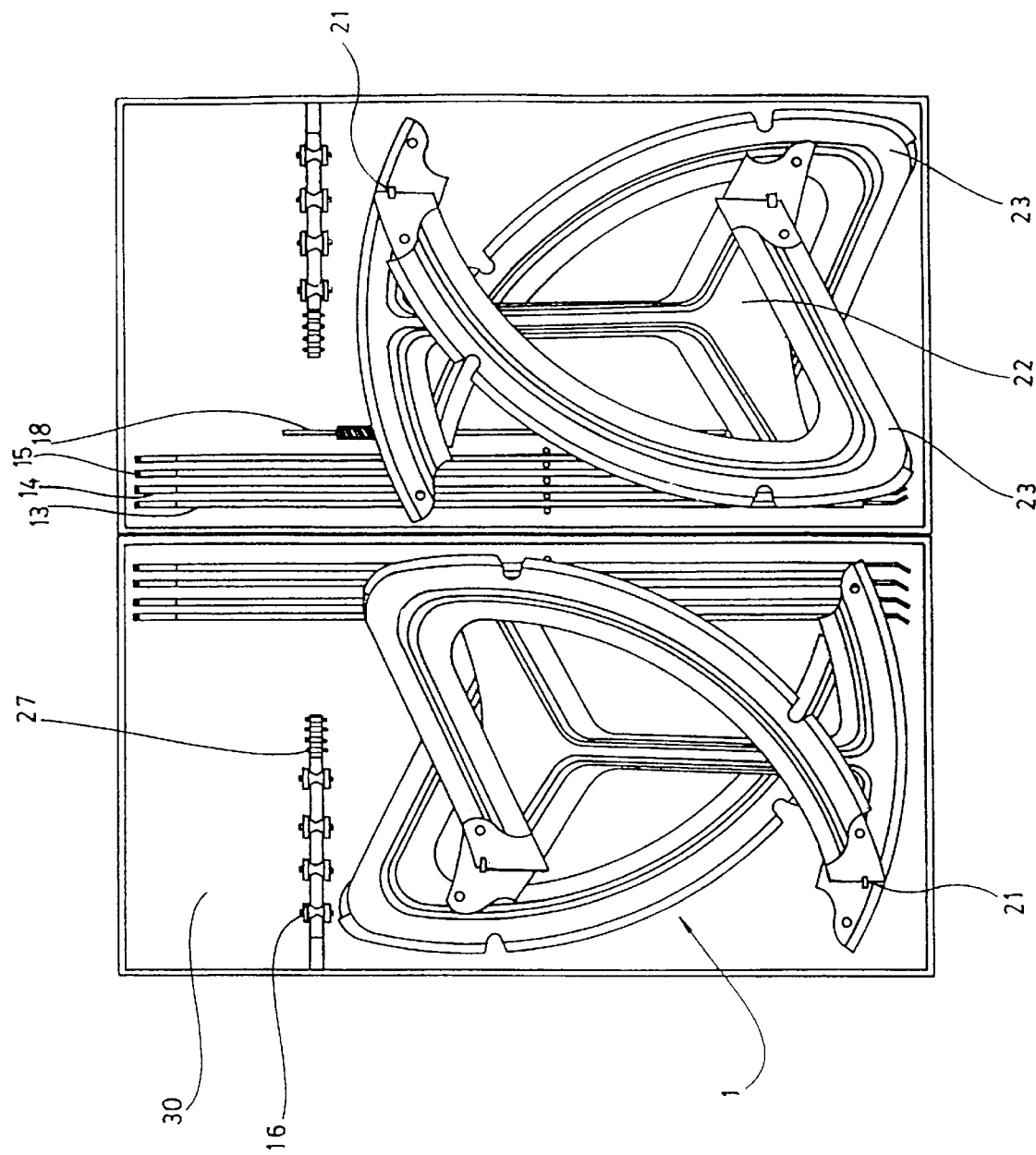
FIG. 9 is an upper plan view of the disassembled and folded device in a stored position in the box.

As best seen in FIGS. 4, 5 and 8, a coupling system between the sections 22 and 23 is made up of a straight connecting line 24 parallel to the-central reinforcement 6, crossing over each hinge 21, perpendicularly cutting the entire width of the curvature of the ring 1 and of the radial bar 3 until it reaches half of its thickness. The coupling system continues in a cut parallel to the front and rear walls, and transitions into a new cut perpendicular to the walls of the ring 1 generating a curved and countercurved connecting line 25 where the rubber is cut 9. The connecting line 25 appears through the wall of the ring 1 opposite the hinge 21 at a short distance from the hinge and toward the round ends 4 of the ring 1. The coupling system makes it possible to collapse and fold up the ring 1 in such a way that the central reinforcement 6 in a closed position is located between the other two end sections 23. A small hole 26 is located between the hinge 21 and the curved and countercurved joint line 25. The hole 26 extends through the walls of both the central 22 and the end 23 sections. An injected Allen bolt 27 within a cylindrical rubber support 28 is inserted through the small hole 26 and expands when the nut 29 is tightened from the other end, securing the coupling system between central 22 and the end 23 sections when assembling the device. The disassembled and folded device is received by a rectangular box 30 prepared to hold its parts in an orderly fashion, as shown in FIG. 9.

Figure 10:
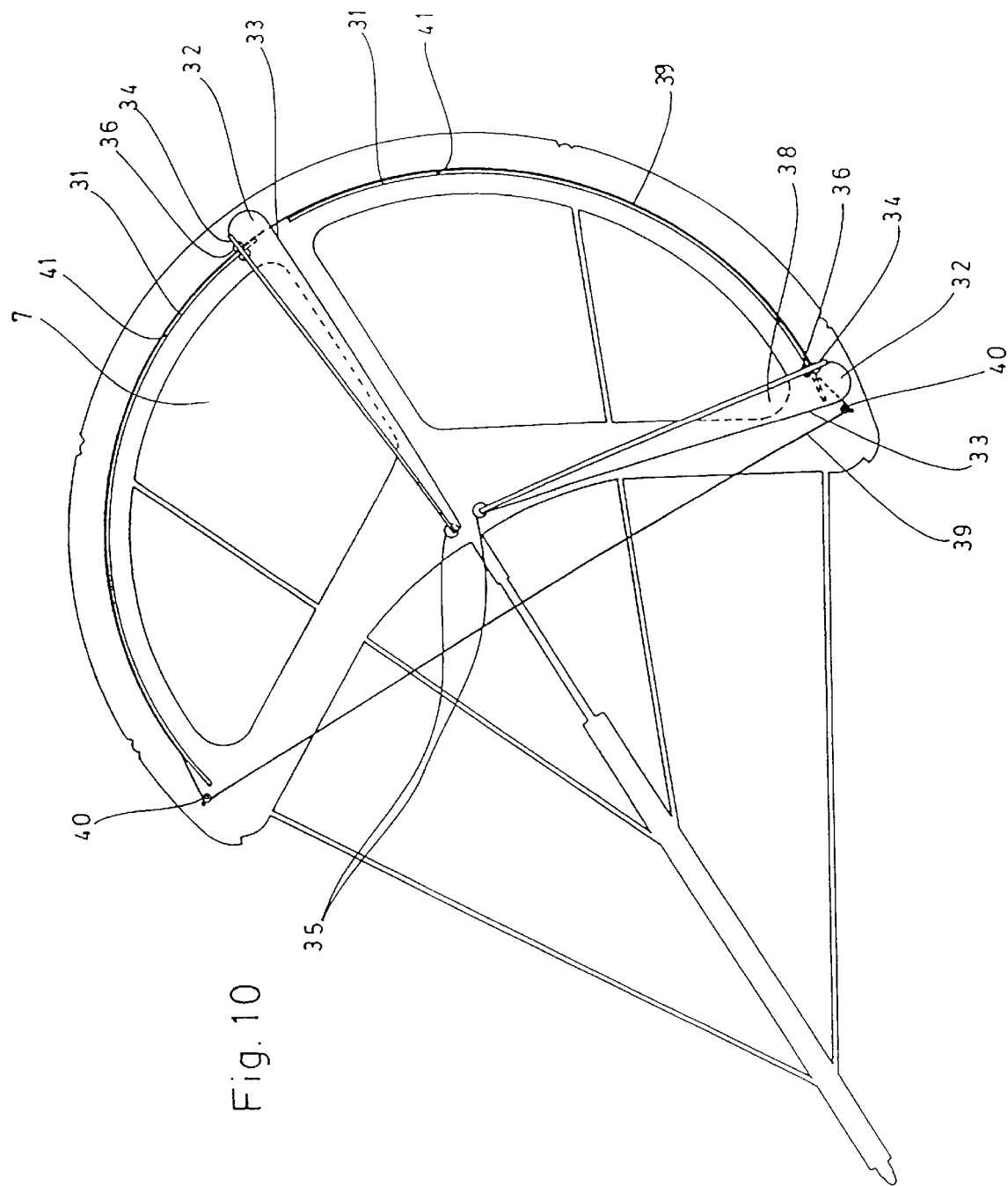
FIG. 10 is a rear elevated view of the device with its sail mechanism in a completely furled position.
Figure 11:
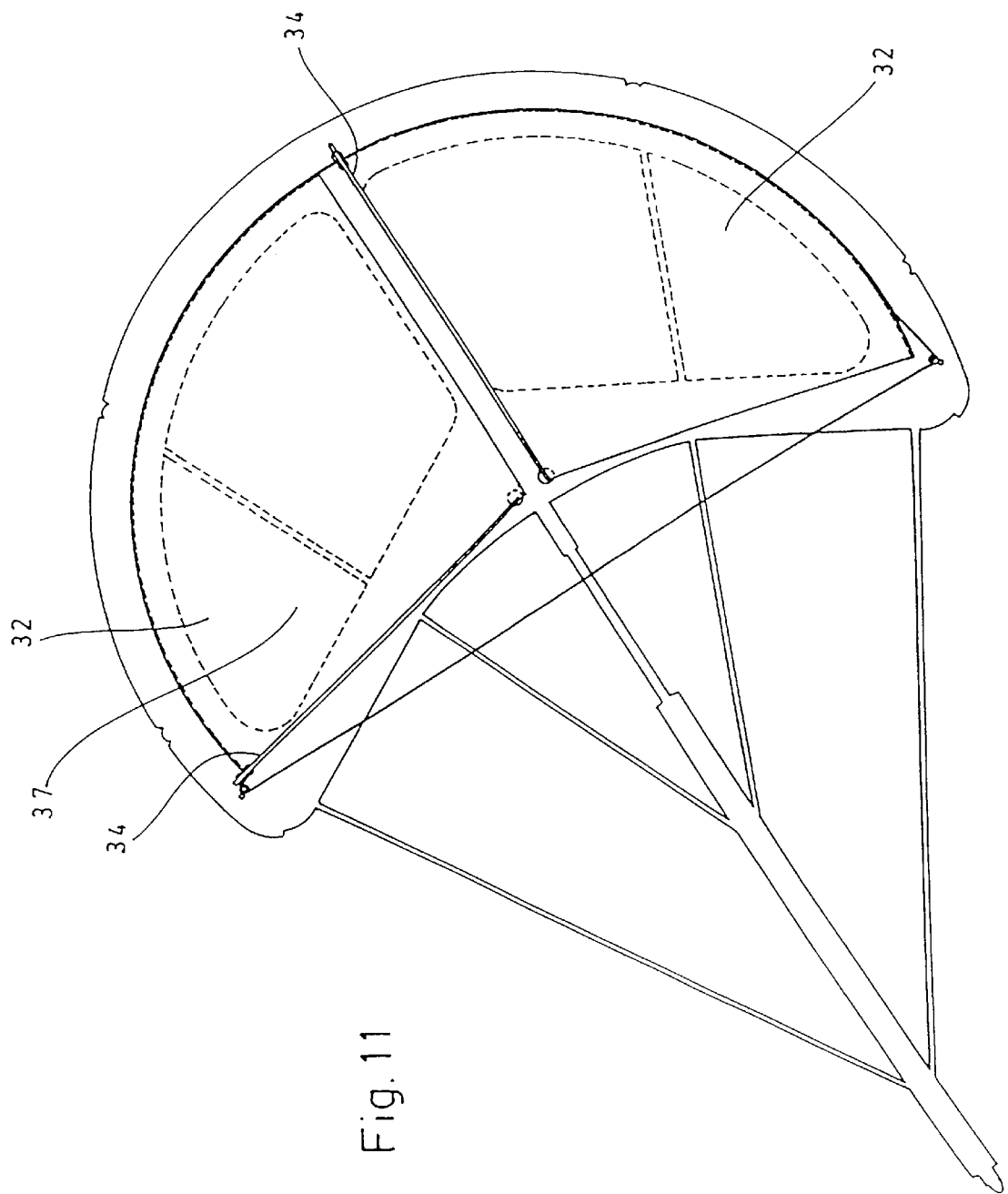
FIG. 11 is a rear elevated view of the device with its sail mechanism in a completely unfurled position.

On one face of each ring 1 and near the inside edge of its curvature, two guide rails 31 of the cell membranes 32 are located, as seen in FIG. 10. The guide rails 31 are slightly separated from each another at the central axis of the ring 1, and they extend until they reach the radial bars 3. The guide rails 31 make it possible to furl and unfurl the sail 32 in each hollow section 7 of the ring 1. The sail 32 is fastened to an arrival line 33 on the central reinforcement 6 for one membrane and on the radial bar 3 for the other membrane. Each membrane is fastened to a support rod 34 connected to a pivoting sheave 35, very close to the geometric center of the ring 1, and to sheaves 36 which run along the rail 31. The hollow section 7 is entirely covered with each membrane extended in an unfurled position 37. Both membranes may be entirely gathered in a furled position 38, in addition to the intermediate combinations such as half furled and others.

The furling operation is performed at the driver's discretion by means of a tensed cable 39 for furling and unfurling the sails 32. Each tensed cable 39 crosses the cabin near the central vertex 5, attaches to the rods 34, and connects to two pulleys 40, located very close to the rounded ends 4 of the ring 1. The membranes of the sails 32 are furled when pulling the cable 39 in a direction from the pulley 40 closest to the arrival line 33 toward the other pulley 40. The membranes of the sails 32 are unfurled by pulling the cable in the opposite direction, i.e., from the pulley 40 farthest from the arrival line 33 toward the other pulley 40. Each rail includes a cut 41 on the folding axes of the central 22 and the end 23 sections, which makes it possible to keep the sail system 32 assembled, even in a stored or closed position by only removing the cable 39 and guiding the rods 34 toward the central reinforcement 6 so that they are located between the axes of the hinges 21 in the central section 22 of the ring 1.

Figure 12:
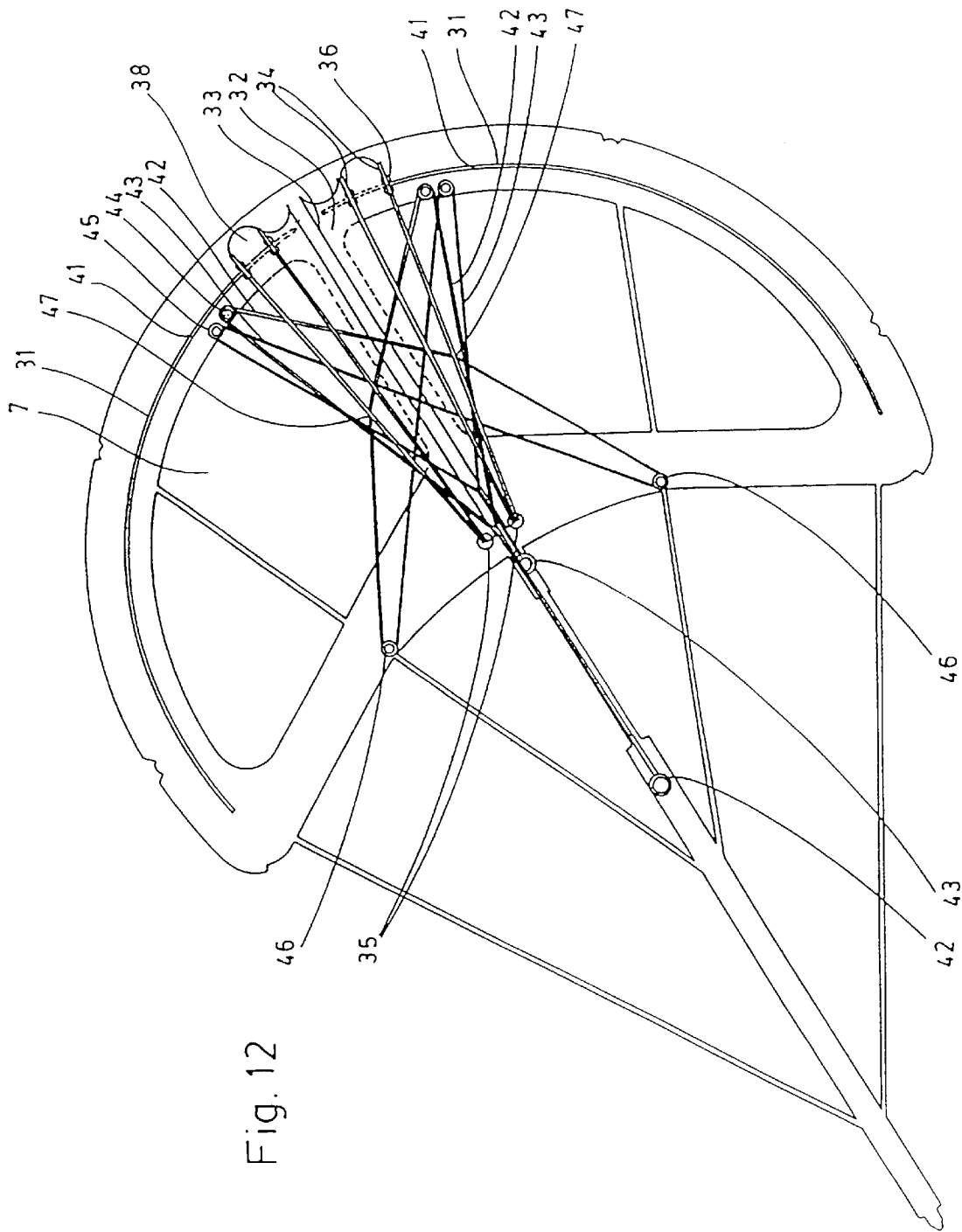
FIG. 12 is a rear elevated view of the device considering an alternative of the sail mechanism, in a completely furled position.

Despite the fact that the preceding mechanism describes and illustrates a reference embodiment of the furling and unfurling mechanism of the sails 32, other constructive forms are possible. In an alternative embodiment of the mechanism for furling and unfurling the sails 32, see in FIGS. 12 and 13, on one side of each ring 1 and near the inside edge of its curvature, two guide rails 31 of the four membranes of the sails 32 are located, slightly separated from each other by the central axis of the ring 1. The guide rails 31 extend until they reach the radial bars 3, making it possible to furl and unfurl, in each hollow section 7 of the ring 1, the sails 32. Each sail 32 is fastened to an arrival line 33, on the central reinforcement 6, and to two support rods 34, dividing the membranes of the sails 32 on each hollow section 7 of the ring 1. The support rods 34 are connected to a pivoting sheave 35, very close to the geometrical center of the ring 1, and to sheaves 36 which run along the rail 31. Each hollow section 7 is entirely covered with each membrane extended in an unfurled position 37. The membranes may also be entirely gathered in a furled position 38, in addition to the intermediate combinations, such as half furled and others.

The furling operation is performed at the driver's discretion through a cable with a furling handle 42 and a cable, and with an unfurling handle 43 and cable. The handles 42 and 43 are located in the geometric center of the ring 1 and are connected by the cable to furling 44 and unfurling 45 pulleys, respectively, located in the internal profile of the curvature of the ring 1 very close to the rail 31 and near the joint lines 24 of the central section 22. The cables are distributed to a furling pulley 44 next to an unfurling pulley 45 in each hollow section 7. Each furling cable 42 is directed toward the support rod 34 farthest from the central reinforcement 6 on the opposite hollow section 7, while each furling cable 43 is directed to a pulley 46 in the opposite hollow section 7, located on the outside edge of the radial bars 3, at the point where it clamps the curvature of the central vertex 5, and which is in the same axis of the pulley 45 parallel to the central reinforcement 6. The unfurling cable 43 is then directed until it reaches the closest support rod 34, with both cables 42 and 43 approximately at the half-way point of the aforesaid support rod 34, at a furling-unfurling traction point 47. The furling system 38 operates by pulling the handle of the furling cable 42 and by traction, the handle of the unfurling cable 43 is gathered, with the sail membranes 3-2 being gathered and vice versa. When the sail system 32 is in a furled position 38, it does not exceed the joint lines 24 and 25 of each central section 22, which, joined to a cut 41 in each rail, on the folding axes of the central 22 and the end 23 sections, makes it possible to keep the sail system 32 entirely fitted to the rings 1, even in a stored or closed position.

Although this invention has been described in terms of certain preferred embodiments, other embodiments that are apparent to those of ordinary skill in the art are also within the scope of this invention. Accordingly, the scope of the invention is intended to be defined by the claims that follow.

We claim:

1. An improved land transportation device for open areas of compact and sandy soils with or without slopes, comprising two substantially identical truncated rings that are reinforced and positioned side-by-side at right angles to each other said rings having open sections within them; sails deployed in said open sections and being adapted to propel said device when exposed to wind, said device adapted to be propelled by a combination of gravitational force and wind thrust on the sails that, when in motion rotate and thereby generate the form of a sphere.

2. A land transportation device according to claim 1, wherein each ring comprises:
   a rim forming an arc extending between two locations on, and describing about two-thirds of, the circumference of a circle;
   radial bars connecting the rim at said locations and extending from said locations to the center of the ring, where said bars are joined; and a reinforcement member, extending from the center to join the rim to give the ring greater, structural strength and rigidity.

3. A land transportation device according to claim 2, further comprising a system of hinges to make it possible to fold each ring into three sections consisting of a central section and two end sections, said sections having walls and said hinge system comprising four hinges, with a first pair of hinges located in said rim, each of said first pair being symmetrically disposed about the point where said reinforcement member joins said rim and a second pair of hinges located in said radial bars, each of said second pair being symmetrically disposed about the center of the ring.

4. A land transportation device according to claim 3, wherein said hinge system comprises one median-plane and two transversal-plane cuts that bisect the structure of the rim and radial bars; each hinge system being composed of a straight-line cut and a curved countercurved-line cut, each separated by the median-line cut perpendicular to them both; and wherein the hinges are located along the straight-line cut parallel to the reinforcement member and are closer to the outer rim of the ring, enabling the ring to be folded thereby reducing its size and facilitating its transportation.

5. A land transportation device according to claim 4, further comprising a safety system comprising a small hole through the walls of both the central and the end sections and located between the hinge and the curved and countercurved joint line, an Allen bolt inserted in a cylindrical rubber support and in said hole wherein said rubber support expands when the nut is tightened from the other end, fixing and securing the system between the central and end sections when the device is assembled.

6. A land transportation device according to claim 4, the rim of each ring has an external surface and a projection extending along the center of said surface, a rubber protective strip adhering to said central projection, the projection and the rubber strip having two cuts in the curved and countercurved line making it possible to fold and couple the central and end sections of the ring, with the rubber projection giving greater adherence to the smooth surface, and reducing the vibrations in a way similar to a rubber tire, thereby facilitating the movement of the device.

7. A land transportation device according to claim 6, further comprising:
   a first pair of grooves in the external surface of the rim with each groove on diametrically opposite sides of the arc formed by the rim, on an axis perpendicular to the axis of the reinforcement member,
   a second pair of grooves in the external surface of the rim between the first pair of grooves and where imaginary lines from the radial bars would extend to said rim and
   tension members retained by said grooves to hold said rings in place and give structure to the device.

8. A land transportation device according to claim 7, comprising eight tension members, each comprising a tube that is solid or filled with expanded polyurethane, each tube having ends flattened perpendicular to each other, and which extend into a small inclined terminal portion which has a central perforation,
   a fastener extending through said perforations to join pairs of tension members through their opposing terminal portions so that four tension tubes extend from each ring to the other, said tension members extending between said first pair of grooves on one ring to said second pair of grooves on the other ring and between said second pair of grooves on said one ring to the first pair of grooves on the other ring to maintain the rings rigid, thereby structurally closing the device.

9. A land transportation device according to claim 8, further comprising a connector member fitting in said grooves and having the shape of two truncated conical sections joined at their smaller ends with their larger ends joined to annular projections, said rims having an outer surface that said annular projections engage to retain said connectors in said grooves, bolts, extending from said connectors through the central perforation of the inclined terminal portion of a pair of tension tubes, which are secured with nuts that allow for quick installation and disassembly.

10. A land transportation device according to claim 8, comprising two reinforced truncated rings and filled or hollow tension tubes filled with expanded polyurethane, to reduce the weight of the device and facilitate movement on major slopes and reduce the physical effort required to break its inertia and to handle the device.

11. A land transportation device according to claim 3, wherein one pair of hinges is located toward the front face of the ring and the other toward the back face in such a way that the central section of the ring is located between the two end sections when the ring is folded.

12. A land transportation device according to claim 2, wherein the centers of the rings are separated by a distance approximately that of the radius the ring, generating between the rings a central space or driver's cabin the device further comprising:
- a bar connecting the rings together at their centers and having springs at its ends;
- a tubular handle over said bar and freely rotatable around said bar by means of bearings between them and
- a harness for the driver attached to the bar, so that the driver is free within the device.

13. A land transportation device according to claim 1, wherein said rings are aligned along an intersection axis and said reinforcement member is located along said axis and said member divides each ring into two hollow sections that are symmetrical with each other.

14. A land transportation device according to claim 13, wherein both symmetrical hollow sections have an internal perimeter, shaped by three successive and decreasing steps toward the hollow area of said sections, said steps being composed of expanded polyurethane, giving firmness and lightness to the device and providing it with greater aerodynamic capacity.

15. A land transportation device according to claim 13, further comprising a sail structure on each of said rings comprising
- two sail guide rails located on each ring, extending near the inside edge of the curvature of the rings separated by the reinforcement member and which reach the radial bars,
- a sail membrane on each hollow section, fastened to an arrival line on the reinforcement member for one membrane and on the radial bar for the other membrane,
- a support rod to which each sail membrane is fastened and that pivots from a central sheath and is connected to sheathes that run along the rail,
- a furling-unfurling cable near the center of the ring, which is fastened to the rods and is connected to two pulleys located on the rounded ends of the curvature of the ring, making it possible to furl the membranes, gathering them up entirely, by pulling the cable in a direction from the pulley closest to the arrival line of the membrane and toward the other pulley, and vice versa to unfurl the membranes to extend them and substantially entirely cover each hollow section of the ring, in addition to intermediate positions of the sails, such as half furled, by maneuvering the sails at a driver's discretion, and regulating the speed direction and operation of the device since this operation is independent for each ring.

16. A land transportation device according to claim 15, wherein the device is symmetrical, allowing movement in both directions, forward and backward, and easily allowing changes in direction, by the driver's leaning his own weight toward one side of the device to turn, or by furling the membranes of one ring.

17. A land transportation device according to claim 15, comprising a cut in the guide rail of the sails under the hinges of the hinge system such that when removing the furling-unfurling cable and turning the rods toward the central reinforcement in the central section of the ring, the system remains fitted to the rings, even in a folded position, which facilitates transportation of the device.

18. A land transportation device according to claim 3, further comprising a sail structure on each of said rings and comprising a sail furling and unfurling mechanism having two membranes joined to the center of the ring and fastened to two support rods in each hollow section of the ring and, when operating furling and unfurling handles which are joined to a system of cables and pulleys, both membranes extend entirely in an unfuled position, entirely covering the hollow section; when one membrane is entirely unfurled and the other gathered a half-furled position is achieved; and when both membranes are gathered they cover a slight central area in a furled position, with the guide rail additionally presenting a cut on the joint lines of the central section of the ring and, when the sails are furled their different parts do not extend beyond the said central section, which makes it possible to maintain the sail system fitted to the rings, even in a closed or stored position.

19. A land transportation device according to claim 1, comprising the device disassembled and folded in a rectangular box.

20. A land transportation vehicle in the form of a kit comprising:
- a pair of truncated rings;
- a bar for connecting the rings together and providing a space therebetween for a rider; and
- a plurality of stabilizers for connecting said rings together to provide structural integrity to the vehicle.

21. The vehicle kit of claim 20, wherein each ring comprises:
- an arcuate portion defining approximately two-thirds of a circle;
- two radial bars extending from the terminal ends of said arcuate portion generally toward the center of the ring and joined together at a rounded central vertex; and
- a linear central reinforcement extending from said central vertex to said arcuate portion for structural strength and rigidity.

22. The vehicle kit of claim 21, wherein the linear central reinforcement is located on said intersection line between said planes, and divides each ring into two hollow sections symmetrical to one another and defining two cavities.

23. The vehicle kit of claim 22, wherein said symmetrical hollow sections are reinforced on the perimeter, both on first and second opposed faces, by a stepped cross-section having decreasing thickness toward each cavity.

24. The vehicle kit of claim 22, further including a retractable sail structure on each of said truncated rings, comprising:
- two arcuate guide rails provided on said arcuate portion and associated with said hollow sections, said guide rails extending approximately from said radial bars around said arcuate portion and spaced apart at said central reinforcement;
- each hollow section provided with a support rod pivoted about a sheath proximate to the geometric center of the ring, said support rod extending generally radially outward and having a second sheath attached thereto adapted to run along said guide rail; and
- a sail membrane for each hollow section fastened to said support rod and having a first position in which said sail structure is furled, and a second position in which said sail structure is unfurled and said sail membrane entirely covers each hollow section of said ring.

25. The vehicle kit of claim 24, wherein said sail structure further includes a furling/unfurling cable fastened to outer ends of both of said support rods, said furling/unfurling cable guided around said guide rails and directed around two pulleys located proximate the intersection of said arcuate portion and said radial bars, said furling/unfurling cable extending between said pulleys, wherein one of said support rods in said first position lies approximately along said radial bar, and wherein the other of said support rods in said first position lies approximately along said central reinforcement, and wherein said one of said support rods in said second position lies approximately along said central reinforcement, and wherein said other of said support rods in said second position lies approximately along one of said radial bars, the movement of both support rods being slaved to movement of said cable, the sail structure allowing partial unfurling of said sails on each truncated ring.

26. The vehicle kit of claim 25, wherein said guide rails are cut at the location of each said coupling system enabling said truncated rings to be folded without removing said guide rails.

27. The vehicle kit of claim 22, further including a retractable sail structure on each of said truncated rings, comprising:

two arcuate guide rails provided on said arcuate portion and associated with said hollow sections, said guide rails extending approximately from said radial bars around said arcuate portion and spaced apart at said central reinforcement;

each hollow section provided with two support rods pivoted about a common sheath proximate to the geometric center of the ring, said support rods extending generally radially outward and having second sheaths attached thereto adapted to run along said guide rails; and a sail membrane for each hollow section fastened to said support rods and having a first position in which said sail structure is furled along said central reinforcement, and a second position in which said sail structure is unfurled and said sail membrane entirely covers each hollow section of said ring, a first one of said support rods being attached to a free edge of said membrane, said free edge lying adjacent the radial bar associated with said hollow section when said sail structure is unfurled.

28. The vehicle kit of claim 27, wherein said sail structure further comprising:

a furling cable having bifurcated portions fastened to traction points along each of said first support rods, said bifurcated portions directed around a first pair of pulleys located on said arcuate portion on opposite sides of said central reinforcement, said bifurcated portions converging at a location proximate said central vertex and along said intersection line, said furling cable continuing away from said arcuate portion and terminating in a furling handle;

an unfurling cable having bifurcated portions fastened to said traction points along each of said first support rods, said bifurcated portions directed around a second pair of pulleys located on said radial bars on opposite sides of said central reinforcement, said bifurcated portions directed around a third pair of pulleys located on said arcuate portion on opposite sides of said central reinforcement, said bifurcated portions converging at a location proximate said central vertex and along said intersection line, said unfurling cable continuing away from said arcuate portion and terminating in an unfurling handle, the movement of both first support rods being slaved to movement of said furling and unfurling cables, the sail structure allowing partial unfurling of said sails on each truncated ring.

29. The vehicle kit of claim 28, wherein said truncated ring comprises a central section and two end sections, and said device includes:

a system of hinges for collapsing said truncated ring at the intersection between said central section and said two end sections, said system of hinges comprising two pairs of hinges, each of said hinges parallel to said central reinforcement, said pairs of hinges being located on opposite sides of said reinforcement, and wherein one hinge of each of said pairs of hinges lies on said arcuate portion and the other hinge lies on one of said radial bars, and wherein said first, second and third pairs of pulleys are located on said central section of said truncated ring so that said ring can be collapsed without disassembling said sail structure.

30. The vehicle kit of claim 21, wherein said truncated ring comprises a central section and two end sections, and said vehicle includes:

a system of hinges for collapsing said truncated ring at the intersection between said central section and said two end sections, said system of hinges comprising two pairs of hinges, each of said hinges parallel to said central reinforcement, said pairs of hinges being located on opposite sides of said reinforcement, and wherein one hinge of each of said pairs of hinges lies on said arcuate portion and the other hinge lies on one of said radial bars.

31. The vehicle kit of claim 30, wherein one of said pairs of hinges is located toward a front face of said ring, and the other of said pairs of hinges is located toward a back face of said ring, so that said ring is collapsed with said central section of said ring located between the two end sections.

32. The vehicle kit of claim 31, further including a rectangular box sized to hold said kit in a folded condition.

33. The vehicle kit of claim 30, wherein each ring is collapsed to reduce volume and facilitate transportation by means of a coupling system between said central section and said end sections, comprising:

a straight cut line, parallel to said central reinforcement, each cut line crossing over a hinge parallel to the hinge axis and formed on both said arcuate portion and said radial bars, said cut line extending from a first face of said ring approximately halfway toward a second face of said ring;

a second cut parallel to said first and second faces of said ring extending from said first straight cut line away from said central reinforcement; and an S-shaped joint line perpendicular to said second cut and terminating at said second face.

34. The vehicle kit of claim 33, including a safety system comprising:

a plurality of small holes extending through said first and second faces of both said central section and said end sections, one of said holes located between each hinge and associated S-shaped joint line; and an injected Allen bolt within a cylindrical rubber support installed within each of said small holes, said cylindrical rubber support expanding when said Allen bolt is tightened, thus fixing and securing the coupling system between the central section and the end sections when the device is assembled.

35. The vehicle kit of claim 33, including:

a central projection on the circumference of said arcuate portion; and a convex rubber protective strip adhered over said central projection, said projection and said strip being discontinuous at the location of said S-shaped joint line whereby said central section and said end sections of the ring are collapsed and coupled, said rubber protective strip providing greater adherence to smooth surfaces on which said device travels, and reducing vibrations from said travel.

36. The vehicle kit of claim 21, including:

springs on either end of said connection bar;

a tubular handle journaled over said fastening bar, forming a handlebar for a driver; and a driver's harness fastened to said handlebar.

37. The vehicle kit of claim 21, wherein said reinforced truncated rings comprise hollow extension tubes filled with expanded polyurethane to reduce the weight and facilitate movement of the device.

38. The vehicle kit of claim 20, wherein said stabilizers comprise:

a plurality of resilient tension tubes for attachment at four connection points on the arcuate portion of each truncated ring, a first pair of said connection points located along virtual projections of said radial bars, and a second pair of said connection points located along a diametric line of said rings perpendicular to said central reinforcement.

39. The vehicle kit of claim 38, wherein said connection points comprise small holes formed in the circumference of said arcuate portion, wherein said tension tubes are adapted to extend between said first pair of connection points on one truncated ring to said second pair of connection points on the other truncated ring, and between said second pair of connection points on the first truncated ring to said first pair of connection points on the other truncated ring.

40. The vehicle kit of claim 38, wherein there are eight of said tension tubes.

41. The vehicle kit of claim 38, wherein said tension tubes comprise hollow elongated tubes filled with expanded polyurethane, and wherein opposite ends of said tubes are flattened in planes perpendicular to one another, said tubes including small terminal portions adjacent said flattened portions and inclined out of the plane of said flattened portions, said terminal portions including apertures, said connection points comprising small holes formed in the circumference of said arcuate portion, and said kit including a plurality of connectors configured to insert in said small holes and adapted to attach to said apertures in said terminal portions of said tension tubes.

42. The vehicle kit of claim 41, wherein said tension tube connector comprises:

a pair of injected bolts within a rubber support, said support having two truncated conical sections joined at their smaller bases, said support having annular projections from the larger bases of said conical sections, and wherein said injected bolts project from the center of each annular projection in opposite directions, said terminal portion apertures of said tension tubes being sized to fit over said extending bolts, said connector further including nuts coupled to said bolts and attaching said tension tubes to said rubber support.

43. A method for land transportation comprising the steps of:

a) providing a transportation device having two truncated rings substantially lying in two planes, respectively, and a bar substantially laying in both of said planes for connecting said two rings;

b) placing said device on ground with said two rings being in touch with the ground and acting as wheels;

c) seating a rider to said bar in a space between said two rings;

d) driving said device with wind or on sloped ground.

44. The method of claim 43, wherein step a) comprises assembling said device from a disassembled form.

45. The method of claim 43, further comprising disassembling and storing said device in a box after step d).

46. The method of claim 43, wherein step a) comprises adjusting said two truncated rings so that the two planes in which the two rings lay are perpendicular to each other.

47. The method of claim 46, wherein step d) provides a periodical and steady movement for the rider by keeping the geometric center of said device moving forward smoothly through rotation of said two rings about an axis defined by said bar.

48. The method of claim 43, wherein each truncated ring has an arcuate portion defining approximately two thirds of a circle, two radial bars extending from the terminal ends of said arcuate portion toward the center of the ring and joined together at a rounded central vertex, and a linear central reinforcement extending form said central vertex to said arcuate portion.

49. The method of claim 48, further comprising providing a sail structure on each of said truncated rings, wherein the linear central enforcement is located on an intersection line defined by the bar between the two rings, and the enforcement divides each ring into two hollow sections symmetrical to one another and defining two cavities, said sail structure comprises:

two arcuate guide rails provided on said arcuate portion, and associated with the hollow sections, said guide rails extending approximately from said radial bars around said arcuate portion and spaced apart at said central reinforcement;

each hollow section provided with a support rod pivoted about a sheath proximate to a geometric center of the ring, said support rod extending generally radially outward and having a second sheath attached thereto adapted to run along said guide rail;

a sail membrane for each hollow section fastened to said support rod and having a first position in which said sail structure is furled, and a second position in which said sail structure is unfurled and said sail membrane entirely covers each hollow section.

50. The method of claim 49, wherein said sail structure further comprises a furling/unfurling cable fastened to outer ends of both of said support rods, said furling/unfurling cable guided around said guide rails and directed around two pulleys located proximate the intersection of said arcuate portion and said radial bars, said furling/unfurling cable extending between said pulleys, wherein one of the support rods in said first position lies approximately along said radial bar, and wherein the other of said support rods in said first position lies approximately along said central reinforcement, and wherein said other of said support rods in said second position lies approximately along one of said radial bars, the movement of both support rods being slaved to movement of said cable, the sail structure allowing partial unfurling of said sails on each truncated rings.

51. The method of claim 49, wherein step d) comprises steering said device by furling or unfurling said sail structure.

52. The method of claim 48, wherein step a) comprises providing a plurality of tension tubes extending between and connecting said two truncated rings for strength, said tension tubes attached at four connection points on the arcuate portion of each ring, a first pair of said connection points located along virtual projections of said radial bars, and a second pair of said connection points located along a diametric line of said rings perpendicular to said central reinforcement.

53. The method of claim 48, wherein each truncated ring has a central section and two end sections, a system of hinges for collapsing said truncated ring at an intersection between said central section and said two end sections is provided, said system comprises two pairs of hinges.

54. The method of claim 53, wherein step a) further provides a coupling system between said central section and said end sections, the coupling system comprises:

- a straight cut line, parallel to said central reinforcement, each cut line crossing over a hinge parallel to the hinge axis and formed on both said arcuate portion and said radial bars, said cut line extending from a first face of said ring approximately halfway toward a second face of said ring;
- a second cut parallel to said first and second faces of said ring extending from said first straight cut line away from said central reinforcement;
- an S-shaped join line perpendicular to said second cut and terminating at said second face, said coupling system enabling said ring to be collapsed to reduce its volume and facilitate transportation.

55. The method of claim 54, wherein step a) comprises providing a safety system, the safety system comprises:

- a plurality of small holes extending through said first and second faces of both said central section and said end sections, one of said holes located between each hinge and associated S-shaped joint line;
- an injected allen bolt within a cylindrical rubber support installed within each of said small holes, said cylindrical rubber support expanding when said allen bolt is tightened, thus fixing and securing the coupling system between the central section and the end sections when the device is assembled.

56. The method of claim 48, wherein step a) comprises providing a central space formed between said two truncated rings, a tubular handle journaled over said bar, and a rider's harness fastened to said handle.

57. The method of claim 56 wherein step c) comprises seating said rider in the harness.

58. A method of traversing ground which comprises:
    placing on the ground a transportation device comprising:
        two truncated rings lying in orthogonal planes with respect to each other,
        a bar connecting said rings together, and
        a support for a rider between said rings;
    locating a rider in said support and traversing the ground with said rings acting as wheels to facilitate movement of said device along the ground and transport the rider therewith.

59. The method of claim 58, wherein said rings comprise a wind-catching surface within each of them, said method further comprising exposing said surfaces to the wind to propel the device along the ground.

60. The method of claim 59, wherein said surfaces comprise surfaces that may be furled and unfurled, said step of exposing said surfaces to wind comprising unfurling said surfaces.

61. A method of transportation on the ground by means of wind which comprises:
    providing a transportation device that comprises:
        two enlarged truncated rings lying in planes orthogonal to each other, rim surfaces on the periphery of said rings, sails surfaces within the periphery of each of said rings, a framework connecting said rings together and maintaining said rings in said planes, and
        a support for carrying a passenger;
    placing said device on the ground with said rims in contact therewith;
    locating said passenger in said support, and exposing said sail surfaces to wind to propel the device along the ground.

62. The method of claim 61, wherein said sail surfaces may be furled and unfurled, said method comprising the step of unfurling said sail surfaces to expose said surfaces to the wind.

* * * * *